Oct. 7, 1958   E. S. ROBBINS   2,854,692
VULCANIZING APPARATUS
Filed Feb. 7, 1955   4 Sheets-Sheet 1
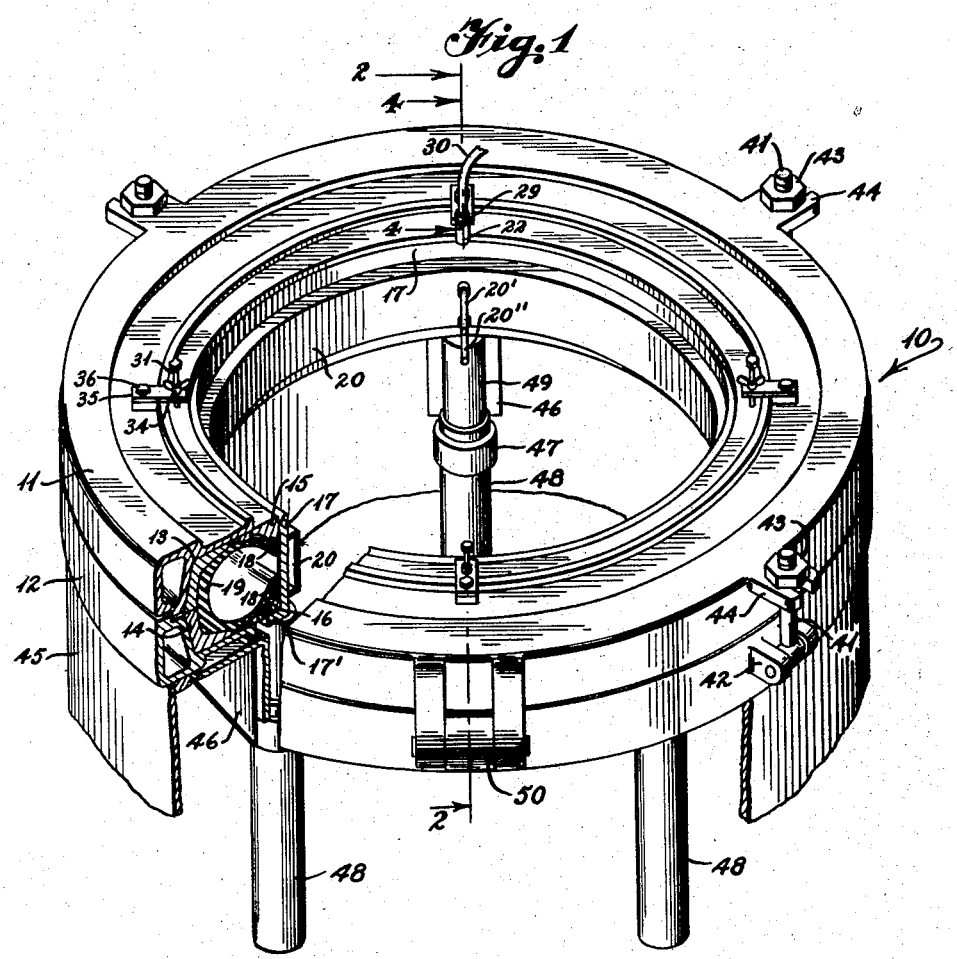
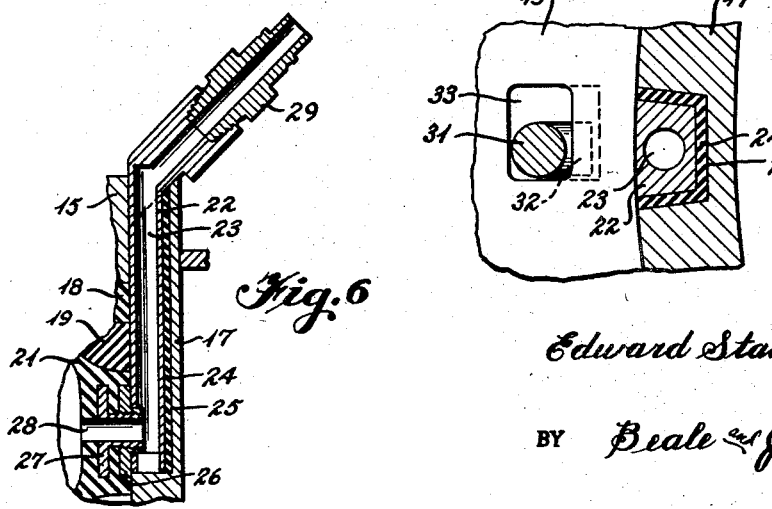
INVENTOR
Edward Stanley Robbins
BY Beale & Jones
ATTORNEYS Oct. 7, 1958  E. S. ROBBINS  2,854,692
VULCANIZING APPARATUS
Filed Feb. 7, 1955  4 Sheets-Sheet 2

INVENTOR
Edward Stanley Robbins
BY Beale & Jones
ATTORNEYS

Oct. 7, 1958  E. S. ROBBINS  2,854,692
VULCANIZING APPARATUS

Filed Feb. 7, 1955  4 Sheets-Sheet 4

INVENTOR
Edward Stanley Robbins

BY Beale & Jones
ATTORNEYS

United States Patent Office 2,854,692
Patented Oct. 7, 1958

2,854,692

VULCANIZING APPARATUS

Edward Stanley Robbins, Killen, Ala., assignor, by mesne assignments, to Robbins Tire and Rubber Company, Inc., Tuscumbia, Ala., a corporation of Alabama Application February 7, 1955, Serial No. 486,594

6 Claims. (Cl. 18—18)

This invention relates to improvements in molds for retreading or recapping tires. Where the expression "recapping" is employed in this specification, it should be understood to encompass all types of similar operations.

Although recapping processes have grown in popularity in recent years, the technology of recapping has not advanced as rapidly as its popularity. A principal disadvantage of the present recapping techniques is the amount of hard labor which is necessary. The amount of hard labor, together with the undesirable working conditions created by the high temperatures required for vulcanization, have created a labor problem in the recapping industry.

An object of the present invention is to provide a simplified molding apparatus which will require less heavy labor during the recapping process than has been necessary in the past.

Another object of the invention is to provide a recapping apparatus which will complete the recapping operation in a much shorter time than has previously been possible.

Still another object of the invention is to provide a recapping apparatus in which higher pressures may be employed than formerly, with a resultant improvement in the quality of the product.

Still another object of the invention is to provide an improvement in apparatus for recapping tires in which proper alignment of the tire carcass within the mold is assured.

A still further object of the invention is to provide means whereby tubeless and conventional pneumatic tires alike may be recapped simply and efficiently in the same apparatus, with no structural changes being necessary.

These and other objects of the invention are achieved by an improved form of the well-known clamshell type of molding equipment. In this improved apparatus, an annular rim is provided having a flat exterior surface whose diameter is just large enough to provide a snug fit against the beads of a tire carcass. The exterior surface of the rim is desirably smooth over its surface where it engages the tire beads, but is preferably chamfered at its upper extremity in order that the tire may be slipped over it easily. The mold desirably comprises two large back mold pieces, each of which may be provided with heating means for raising the mold to vulcanizing temperature. Attached to the inside of each of these back mold pieces is a conventional matrix for imparting a tread design to the tire. Completing the mold are two detachable, ring-like sidewall members, each of which is desirable but not necessarily provided with heat exchange means.

The cylindrical rim is mounted on hydraulic mechanisms in such a way that it is movable axially with respect to the molds. In order to insert a tire in the mold, the upper and lower molds are separated and the cylindrical rim is dropped down so as to be almost clear of the lower half of the mold. The tire carcass is then placed in the lower half of the mold, the cylindrical rim may be raised into place, and the upper half of the mold is dropped down. The tire carcass is thus completely embraced within the mold, with the open space between the bead portions of the tire facing the flat exterior surface of the cylindrical rim.

Both sidewall members of the mold are detachable from the back mold pieces. The lower sidewall member is adapted to be moved by a hydraulic piston or other suitable means against the sidewall of the tire carcass to remove it from the mold after vulcanization is complete.

The cylindrical rim against which the beads abut is desirably provided with a recess in its exterior surface in which a novel valve stem or other similar conduit may be seated, the conduit being a passage for pressurized fluids into and from the interior of the tire carcass. Where a tubeless tire is to be recapped, the conduit may open directly into the interior of the tire carcass. In this case, the conduit should be provided with an exterior coating of rubber or similar material which will have a gasket action against the walls of the recess in the cylindrical rim, preventing the escape of air from the interior of the tire carcass. Where a conventional type of pneumatic tire is to be recapped, and it is necessary to employ an air container similar to a heavy-duty tube within the tire, the conduit may be connected directly to the air container. In this case, it is not necessary that the conduit be sealed against the walls of the recess by gasketing material, since all of the air under pressure is contained within the air container.

The flat rim against which the beads abut is desirably provided with some type of heating element in order that it may maintain the air within the tire carcass at an elevated temperature and so accelerate the speed of vulcanization. Each sidewall member is also desirably provided with a heat exchange means, so that the portions of the mold which are in contact with the sidewalls may be kept cool during the vulcanizing operation. This prevents discoloration of white sidewall tires.

The invention may be best understood by reference to the drawings, in which:

Fig. 1 is a partial perspective view, partly broken away, showing the assembled molding apparatus;

Fig. 6 is an enlarged sectional detail of the compressed air conduit;

Fig. 7 is a top sectional view taken on line 6—6 of Fig. 4;

Figure 2:
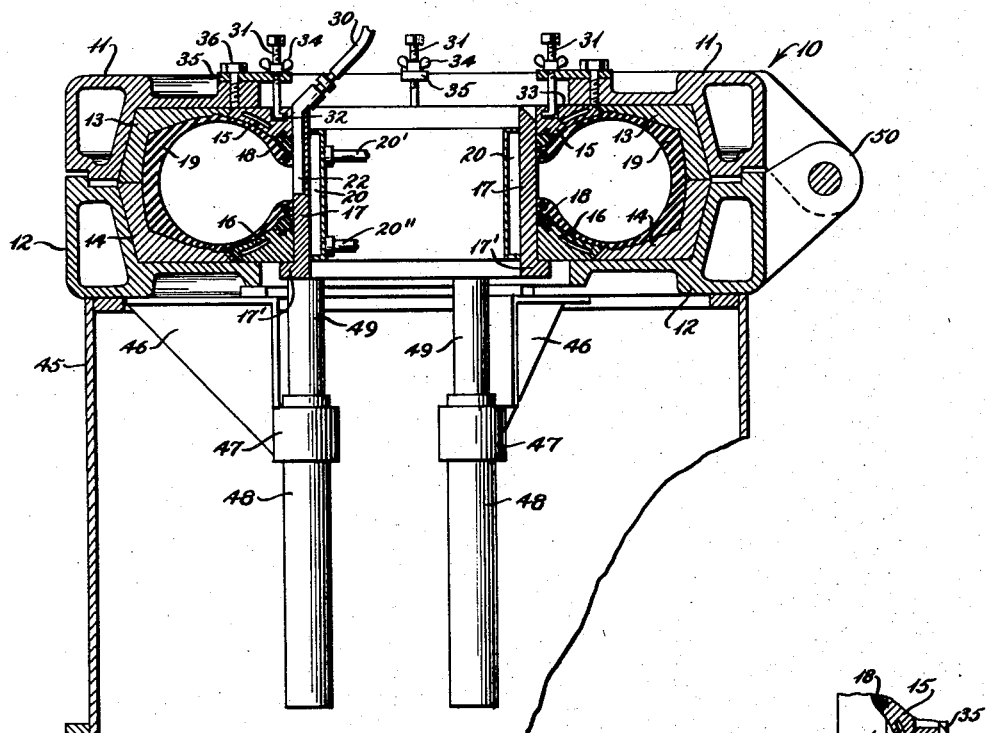
Fig. 2 is a sectional view of the assembled molding apparatus taken on line 2—2 of Fig. 1.
Figure 3:
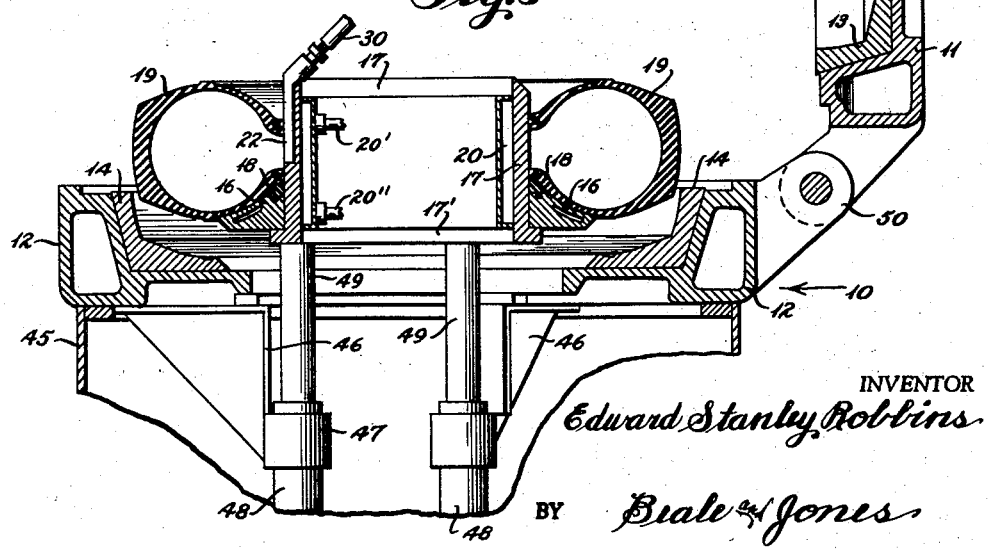
Fig. 3 is a sectional view similar to Fig. 2, showing the mold open and the lower sidewall member ejecting a tire carcass from the mold.

Referring now in detail to Fig. 1, the modified clamshell mold comprises an upper back mold piece 11 and a lower back mold piece 12. An upper matrix 13 is secured to the upper back mold piece 11, and a corresponding lower matrix 14 is secured to the lower back mold piece 12. Each of the back mold pieces is sufficiently extensive to embrace all of the tire carcass over which additional rubber is normally applied. The entire mold is supported in its position by a skirt 45 encircling and depending from the lower back mold piece 12.

The lower portion of the tire carcass, to which new rubber is not normally applied, is confined during vulcanization between the upper sidewall member 15 and the lower sidewall member 16. The bead portions of the tire normally engage these sidewall members 15 and 16 and abut against the smooth surface of the cylindrical rim 17. The cylindrical rim is desirably provided with a chamfered upper edge in order that the beads may slip onto the cylindrical rim as easily as possible.

The upper sidewall member 15 and the lower sidewall member 16 are each supported in place during the vulcanizing operation, against the fluid pressure within the tire, by seating against the corresponding matrix. The edges of each matrix are desirably cut at an angle which is preferably in the range of about 30° to about 60° from the horizontal. Thus, the lower sidewall member will normally be supported by the angularly cut edge of the lower matrix 14. However, the upper sidewall member, although it is restrained in position during vulcanizing by the angularly cut edge of the upper matrix 13 is not normally supported in position by this edge of the matrix. In order to hold it in place, any simple fastening means might be employed. Thus, for example, an adjustable nut and bolt 34 and 31 respectively may be employed to position the upper sidewall member vertically. Although a variety of expedients are available, in converting a conventional type mold into the apparatus of the present invention, a very simple expedient is the securing of a supporting bracket 35 to the upper back mold piece by a bolt 36. Adjustability in this arrangement is provided by seating a flange 32 on the bolt 31 within a recess 33 in the upper sidewall member 15, and as the nut 34 is turned, while seated against the supporting bracket 35, the bolt 31 may be caused to exert an upward force against the upper sidewall member 15.

Cooperating with the sidewall members to close the mold completely is a cylindrical rim 17. This rim 17 is movable axially relative to the mold by a pair of hydraulic pistons 48 which are secured to and supported by the lower back mold piece 12 by a bracket 46 attached to a collar 47 which surrounds the hydraulic mechanism. An outwardly directed flange 17' around the lower peripheral edge of the rim 17 functions as a stop as it engages the lower side wall member 16 and indicates to the operator when the cylindrical rim has been raised into operating position. Further vertical movement of the flange 17' also causes upward movement of the lower sidewall member 16, whereby that member may be caused to function as an ejector to remove the vulcanized tire carcass from the mold.

The cylindrical rim 17 is desirably provided with a steam chamber 20 so that the rim may be heated during the vulcanizing operation. This prevents loss of heat from the mold and imparts some heat to the compressed air within the tire carcass, thus accelerating vulcanization.

During vulcanization, compressed air or other fluid under pressure is injected into the tire carcass through a tubing 30 which is secured to a novel conduit 22, so constructed as to seat within a recess 25 in the cylindrical rim. When compressed air is allowed to enter the tire carcass, the tire will normally be forced against the matrix and other parts of the mold. Usually, the clearance between the bead portions of the tire carcass 19 and the cylindrical rim is only sufficient to facilitate positioning of the carcass over the rim. The application of internal pressure to the carcass tends to force the bead portions of the tire into tight engagement with the surface of the rim and thus causes proper alignment of the tire within the mold.

The several pieces of the mold are restrained against movement during vulcanization by a plurality of heavy bolts 41 which are hinged to the lower back mold piece 12 through a supporting flange 42. Each bolt is secured in a locked position by a nut 43 which rests against a U-shaped projection 44 from the upper back mold piece 11.

In conducting a vulcanizing operation, a carcass 19 having camelback applied thereto is inserted in an open mold. This is most easily accomplished when the cylindrical rim 17 is caused to be lowered by a withdrawal of the hydraulic piston 49 into its housing 48. Since the clearance between the bead portions of the tire and the surfaces of the cylindrical rim are very small, it is generally easier to place the tire carcass in the lower half of the mold than it is to position it over the rim. With the carcass properly positioned in the lower half of the mold, the cylindrical rim will generally be inserted into the carcass with very little trouble, since the mold tends to position and center the tire carcass properly. Furthermore, the lower sidewall member 16 functions as a bearing and centers the cylindrical rim for the proper direction of travel. For this reason, the clearance between the cylindrical rim and the adjacent surface of each sidewall member should be on the order of approximately 0.030 inch. The clearance between the rim surface and the bead portion of the tire should be considerably larger, preferably on the order of $\frac{1}{32}$ of an inch.

After the cylindrical rim has been raised into position, the upper mold half may be lowered into position. Internal pressure is then applied to the tire carcass through the conduit 22 in the cylindrical rim. This internal pressure forces the carcass 19 against the matrix and forces the bead portions of the tire in an outward radial direction. Where a tubeless type tire is being recapped, the carcass will usually be air-tight. In this case, the vulcanizing operation is quite simple, it being necessary merely to inject air directly into the carcass as illustrated in Fig. 2. As the bead portions of the tire are forced outwardly, they compress and distort the gasket members 18, thereby forming a fluid tight seal and preventing the escape of air from within the carcass.

In order to raise the tire to vulcanizing temperature, steam may be passed through the steam chambers in the back mold pieces and through the chamber 20 in the cylindrical rim 17. Since the tire is completely enclosed by the mold, much higher pressures may be employed with the present apparatus than are now customary in recapping processes. For example, pressures of 160 to 180 p. s. i. give very satisfactory results in this apparatus, as contrasted with pressures of 125 p. s. i. which are usually employed. A temperature in the range of 280° F. to 310° F. at this pressure, will cause vulcanization in 25 to 30 minutes.

After the vulcanization is completed, the upper mold half may be raised. In this apparatus, the tire carcass will never go with the upper half of the mold, since any movement of the carcass immediately causes a binding action of the beads on the cylindrical rim. This binding action has been found extremely effective for causing the carcass to remain in the lower mold half.

In order to remove the carcass from the mold, the cylindrical rim is caused to rise vertically by the hydraulic pistons 49. It carries with it the lower sidewall member 16, which exerts sufficient pressure on the carcass to distort it and force it out of the lower matrix 14. Once it has been torn loose from the matrix, the cylindhical rim can be lowered as far as it will go, and it will slide free of the tire carcass with no binding action. Any slight binding action which is observed at this point can be eliminated by the use of mold lubricant between operations.

Where a white sidewall tire is being recapped by the present process, it has been found desirable to circulate cold water through the channels in the sidewall members 15 and 16. This keeps the sidewalls cool and prevents discoloration of the white sidewalls.

Figure 4:
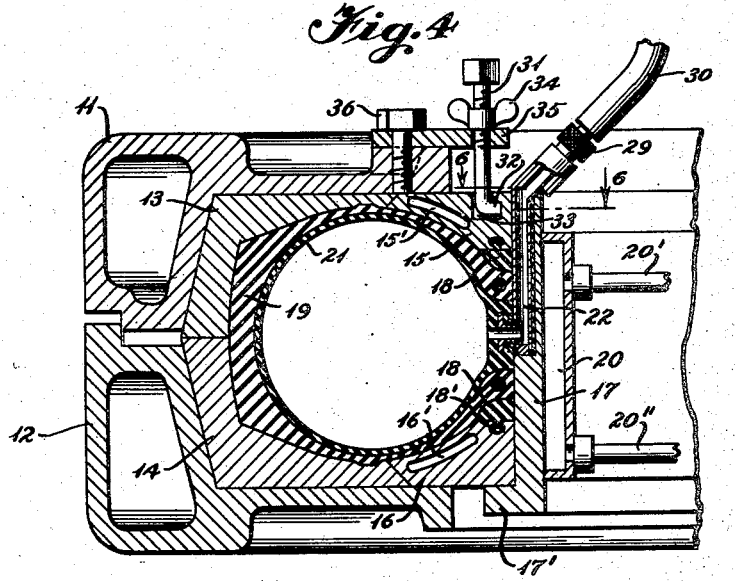
Fig. 4 is an enlarged partial sectional view taken on line 4—4 of Fig. 1.

A modification of the invention is shown in Fig. 4. The compressed air conduit may be employed with both tubeless and conventional tires. It desirably takes the form of a tube having exterior walls which are substantially rectangular in cross sectional area, as illustrated in Figs. 6 and 7. At its lower extremity, the conduit 22 is desirably provided with a protruding circular flange 26 which may protrude from the otherwise smooth surface of the cylindrical rim. The remainder of the conduit 22 is desirably seated entirely within the rim. The flange 26 is preferably provided with internal threads so that it is in effect a female member. When it is desired to perform a recapping operation on a conventional type tire, as illustrated in Fig. 4, the air container or heavy-duty tube may be securely fastened to the air conduit at the flange 26. In this operation, the first step in the process is the securing of the conduit 22 to the air container. The air container is then placed in the tire, and the tire carcass is placed in the mold. The flexible tubing 30 which directs compressed air to the conduit 22 is desirably provided with a quick-release attachment 29 which allows for easy and fast securing of the tubing to the conduit once it is in position. After the tire has been placed in the lower half of the mold, the cylindrical rim may be eased up into position. The conduit slides into the recess with no difficulty if the tire is properly positioned with respect to the cylindrical rim. The top half of the mold is then closed, the outside bolts 41 are secured in position, and pressure may be applied. Ejection of the vulcanized carcass from the mold takes place in the same way as is the case with the tubeless tire. The conduit stays with the tube, and after the carcass has been broken out of the matrix, and the cylindrical rim has been dropped down as far as it will go, the conduit will be found to remain secured to the air container, which may then be removed from the carcass.

Figure 5:
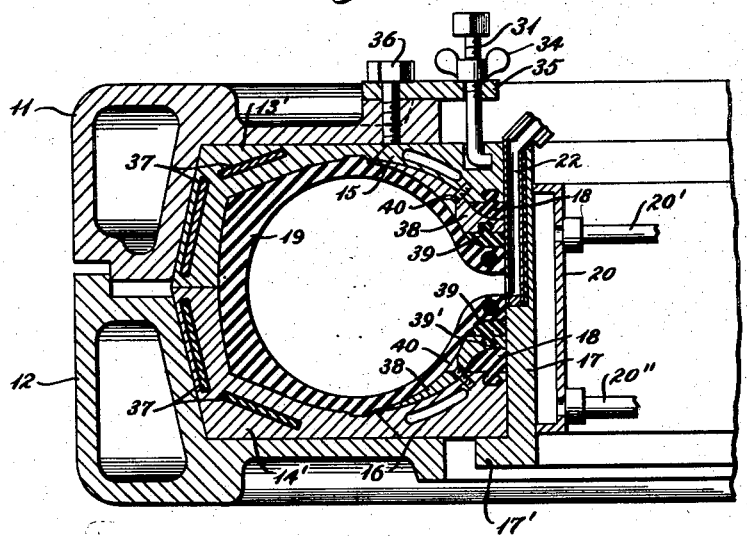
Fig. 5 is an enlarged fragmentary sectional view of a modified form of the invention.

Several modifications of the invention are illustrated in Fig. 5. During the recapping operation, there is a natural tendency for the bead portions of the tire to move outwardly under the internally applied pressure. Where a tire is being recapped which is somewhat too small for the mold, this tendency enhances the sealing effect which is obtained by the compression and distortion of the gasket members 18. However, where the tire carcass is slightly large for the matrices which are being employed, the expansive tendencies of the bead portions of the tire must be controlled in order to avoid distortion of the crown portion of the tire, and in order to assure proper alignment of the carcass against the matrices. This may be done by providing a facing 38 for the upper and lower sidewall members. For simplicity, the facing may be shaped to follow the contour of the sidewall members, and may be provided with its own gasket member 39. Each facing may be secured to the corresponding sidewall member in any conventional manner, as for instance by a plurality of screws 40. The use of the facings 38 offer several advantages. First, the facings position the bead portions of the large tire properly and insure that there is no distortion of the crown portion of the carcass. Secondly, the facings insure a symmetrical disposition of the carcass wtih respect to the inlet for compressed air. Sealing of the fluid within the carcass is obtained by compression and distortion of the gasket members 39 against the opposing surface of the cylindrical rim 17. Fig. 5 illustrates another possible modification, in the provision of electrical heating units 37 in each of the matrices.

Figure 8:
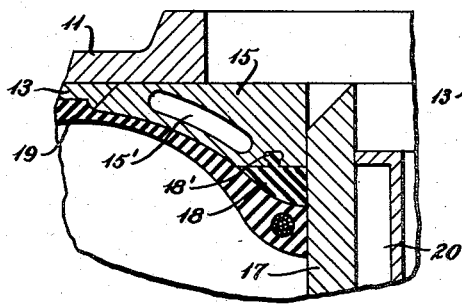
Fig. 8 is an enlarged sectional view showing the sealing gasket in detail.

The preferred type of gasket member 18 is illustrated in detail in Fig. 8. The gasket member may be so shaped as to conform to the natural exterior configuration of the tire carcass 19. The gasket member may be detachably secured to the sidewall member 15 by a locking insert 18' seating in a correspondingly-shaped recess in the sidewall member.

Figure 9:
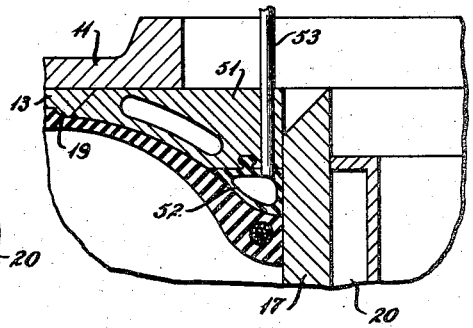
Fig. 9 is an enlarged sectional view illustrating a modified form of sealing gasket.

The gasket member 18 illustrated in Fig. 8 is effective because it distorts under compression to form a seal with the exterior surface of the tire carcass and the cylindrical rim. The modification illustrated in Fig. 9 is effective because compressed air is inserted into an interior cavity 52 in the gasket member through a conduit 53. The internal pressure in the gasket member, together with the pressure applied from the expansion of the bead portion of the tire carcass against the gasket, causes distortion which forms an air-tight seal.

Figure 10:
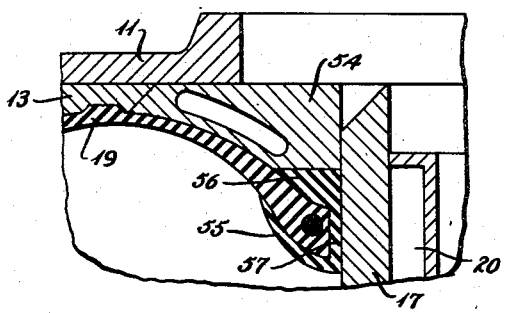
Fig. 10 is an enlarged sectional view showing one form of sealing shoe.

A still further type of gasket member is illustrated in Fig. 10, where an air-tight seal is obtained by slipping a shoe entirely around the bead portion of the tire carcass. This shoe is desirably provided with an interior flange 55 embracing the interior surface of the carcass, and with a flat connecting member 57 which is grasped between the bead portion of the tire carcass and the cylindrical rim, and with a thickened distortable portion 56 which is engaged between and grasped by the bead portion of the tire and the opposed surfaces of the cylindrical rim 17 and the sidewall member 54.

Figure 11:
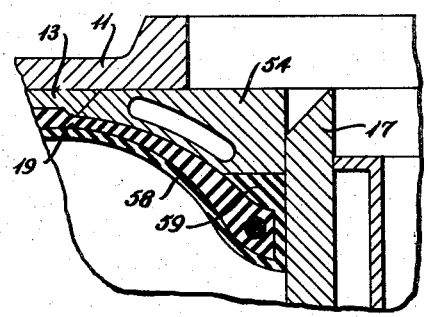
Fig. 11 is an enlarged sectional view illustrating the use of a shoe in connection with an air container.
Figure 12:
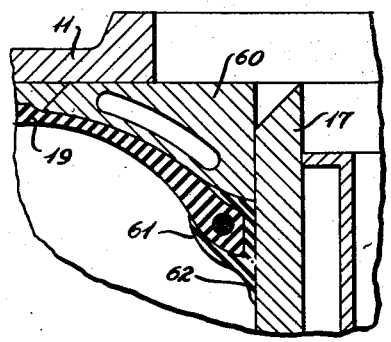
Fig. 12 is an enlarged sectional view of a modified form of sealing shoe.

This same type of shoe may be employed as a flange on an air container 58, as illustrated in Fig. 11. In this case, distortion of the thickened portion 59 between the sidewall member 54 and the cylindrical rim 17 causes the air-tight seal.

Figure 13:
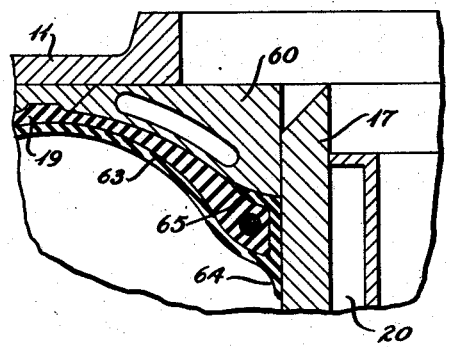
Fig. 13 is an enlarged sectional view of a form of sealing shoe employed in connection with an air container.

As an improved alternative to the shoe illustrated in Fig. 10, a sealing shoe may be employed having a tapered toe 62 of gradually decreasing thickness engaging the surface of the cylindrical rim 17. In this embodiment of the sealing shoe, the flanges 61 serve to position the shoe, and do not function primarily to form a seal. As the pressure is raised inside the tire carcass 19, the toe 62 is caused to engage the cylindrical rim 17 with an ever-increasing pressure which enhances the sealing effect in a direct ratio to the increase in pressure. Naturally, this is a very desirable characteristic in a sealing shoe. A similar construction is illustrated in Fig. 13 for use with an air container 63. In this case, the toe 64 is an extension of the air container sidewall, and the flange 65 serves to position the container properly with respect to the cylindrical rim.

Where shoes are employed to form a seal within the mold, as illustrated in Figs. 10, 11, 12, and 13, the cylindrical rim will of necessity be of a slightly smaller diameter than is true in the other embodiments of the invention. Similarly, where other expedients are employed in the various modifications of the invention, similar dimensional changes may be necessary.

Where the conduit 22 is employed in connection with an air container, an air-tight joint may be obtained by means of the threaded connection internally of the flange 26 at the lower extremity of the conduit. However, where the conduit is used in connection with a tubeless tire, it is necessary to prevent the escape of air between the walls of the recess 25 in the cylindrical rim and the walls of the conduit 22. This may be accomplished by applying a layer of compressible resilient gasket material 25 to the walls of the recess, or alternatively, to the exterior walls of the conduit, as shown in Fig. 6. With this gasket material thus provided, when internal pressure is applied to the tire carcass, the pressure naturally tends to force the conduit against the gasket material, forming a seal and preventing the escape of air around the walls of the conduit.

In order to provide a better illustration of the manner in which this process is conducted, operating data will be described for an actual vulcanizing operation. A conventional mold of the American Tire Machinery Company was modified by the addition of a cylindrical rim, hydraulic pistons for supporting and moving the cylindrical rim, and sidewall members. A 6.70 x 15 tire was buffed, and a piece of camelback 5/16 of an inch thick was secured in place across the crown of the tire. Before placing the tire in the mold, a pair of thermostat probes were placed in position on the tire. A first probe was placed on the bottom of the camelback. A second probe was placed on the surface of the camelback. Readings were taken at these points once each minute during the vulcanizing operation. After the tire was placed in the mold and the mold closed, with the cylindrical rim in place, air at 160 p. s. i. was injected into the air container inside the tire carcass. The mold had been preheated by steam at 60 lbs. pressure, at 303° F. The camelback was found to be vulcanized securely to the tire after a 30-minute interval, during which the pressure inside the carcass was maintained at 160 p. s. i. The following temperature readings were taken during the operation:

Table 1

| Minutes | Temperatures, °F. | |
|---|---|---|
| | Bottom of Camelback | Surface of Camelback |
| 2 | 181 | 236 |
| 5 | 233 | 261 |
| 8 | 257 | 273 |
| 11 | 273 | 283 |
| 13 | 281 | 287 |
| 15 | 284 | 291 |
| 20 | 292 | 295 |
| 23 | 294 | 296 |
| 26 | 297 | 298 |
| 28 | 298 | 298 |
| 30 | 299 | 300 |

Steam pressure=60 p. s. i.
Air pressure=160 p. s. i.

In order to provide the utmost flexibility in the apparatus, it is desirable that all of the parts described above be useable with a plurality of different size matrices. This may be accomplished by use of the angular cut at the point where each sidewall member abuts the adjacent matrix. Thus, when matrices of different thickness are substituted in the mold, the sidewall members will always form a close joint and present a continuous arcuate surface to the tire carcass. This is accomplished by taking the angular cut from the same reference point in the mold, no matter which size matrix may be employed.

In order to decrease the strength requirements of the sidewall members, it is possible to provide locking means between the cylindrical rim 17 and the upper sidewall member 15, not illustrated in the drawings. Such locking means may be of any conventional type, and should be adjustable so that the locking means will take the strain of internal pressure in the carcass, rather than the upper sidewall member.

The foregoing specification is intended to be illustrative of the invention, and should not be construed so as to limit the invention. It is to be understood that various modifications may be made in this invention within the skill of the art. Thus, the apparatus which has been described may be employed in vulcanizing processes over a wide range of temperatures and pressures, and it should be understood that the operation need not be confined to those temperatures and pressures specifically mentioned in this specification.

I claim:

1. An apparatus for vulcanizing new rubber to a tire comprising a frame, a sectional mold that is formed with upper and lower annular mold members that can be assembled to form a mold, means for detachably securing said mold members in assembly, said assembled mold members being provided therebetween with a cavity that is adapted to receive a preformed tire that has new rubber disposed thereon, said mold members comprising respectively crown sections that are adapted to have tread-imparting matrices disposed therein, and rings disposed to embrace the side wall portions of the tire and detachable from said crown sections, said rings being spaced axially when said mold-members are assembled, said lower crown section being supported on said frame, the inner margins of said rings being aligned axially and defining a central opening that is coaxial with said mold cavity, a unitary, generally cylindrical rim movable inside said opening coaxially therein, and means for reciprocating said rim axially of said opening in a rectilinear path between a first position permitting loading of the tire in said mold members and a second position in which said rim closes the space between said rings thereby closing said mold cavity.

2. An apparatus for vulcanizing new rubber to a tire comprising a frame, a sectional mold that is formed with upper and lower annular mold members that can be assembled to form a mold, means for detachably securing said mold members in assembly, said assembled mold members being provided therebetween with a cavity that is adapted to receive a preformed tire that has new rubber disposed thereon, said mold members comprising respectively crown sections that are adapted to have tread-imparting matrices disposed therein, and rings disposed to embrace the sidewall portions of the tire and detachable from said crown sections, said rings being spaced axially when said mold members are assembled, said lower crown section being supported on said frame and having an inside diameter that is smaller than the outside diameter of said lower sidewall ring to support said lower sidewall ring for removal in an upward direction only, the inner margins of said rings being aligned axially and defining a central opening that is coaxial with said mold cavity, a unitary, generally cylindrical rim movable inside said opening coaxially therein, and means for reciprocating said rim axially of said opening in a rectilinear path between a first position below said mold permitting loading of the tire in said mold members, a second position in which said rim closes the space between said rings thereby closing said mold cavity, and a third position, said rim being formed with a projecting flange of larger outside diameter than the inside diameter of said lower ring to be engageable against said lower ring to permit said ring to be lifted from said lower crown section by said rim and held above said lower crown section in said third position of said rim.

3. An apparatus for vulcanizing new rubber to a tire comprising a frame, a sectional mold that is formed with upper and lower annular mold members that can be assembled to form a mold, means for detachably securing said mold members in assembly, said assembled mold members being provided therebetween with a cavity that is adapted to receive a preformed tire that has new rubber disposed thereon, said mold members comprising respectively crown sections that are adapted to have tread-imparting matrices disposed therein and rings disposed to embrace the sidewall portions of the tire and detachable from said crown sections, said rings being spaced axially when said mold members are assembled, said lower crown section being supported on said frame, the inner margins of said rings being aligned axially to define a central opening that is coaxial with said mold cavity, a unitary, generally cylindrical rim movable inside said opening coaxially therein, means for reciprocating said rim axially of said opening in a rectilinear path between a first position below said mold permitting loading of the tire in said mold members and a second position in which said rim closes the space between said rings thereby closing said mold cavity, means for supplying fluid under pressure through said rim to the interior of said tire, and a pair of resilient members interposed between and engaged against respectively said rings and the confronting portions of the sidewalls of said tire, and the bead portions of said tire and the confronting portions of the surface of said rim, said resilient members being compressible upon expansion of said tire to form fluid-tight seals between said rings and the confronting portions of the sidewalls of the tire, and the bead portions of said tire and the confronting portions on the surface of said ring, respectively.

4. In an apparatus for vulcanizing new rubber to a tire comprising a frame, a sectional mold that is formed with upper and lower annular mold members that can be assembled to form a mold, means for detachably securing said mold members in assembly, said assembled mold members being provided therebetween with a cavity that is adapted to receive a preformed tire that has new rubber disposed thereon, the inner margins of said mold members being spaced axially and aligned axially and defining a central opening that is coaxial with said mold cavity, and a generally cylindrical rim mounted coaxially in said opening to close the space between said mold members thereby closing said mold cavity in one position thereof; the improvement comprising said rim being formed on its outer surface with an axially-extending recess that is extended to open through one end of said rim, and a member disposed in said recess in fluid-tight relation and with its outer surface flush with the outer surface of said rim, said member being formed with a generally right angular bore that opens at its lower end through the outer surface of said member for communication with the interior of said tire when said rim is disposed to close said mold cavity and that opens at its upper end for communication with a fluid supply.

5. An apparatus for vulcanizing new rubber to a tire comprising a frame, a sectional mold that is formed with upper and lower annular mold members that can be assembled to form a mold, means for detachably securing said mold members in assembly, said assembled mold members being provided therebetween with a cavity that is adapted to receive a preformed tire that has new rubber disposed thereon, said mold members comprising respectively crown sections that are adapted to have tread-imparting matrices disposed therein, and rings disposed to embrace the sidewall portions of the tire and detachable from said crown sections, said rings being spaced axially when said mold members are assembled, said lower crown section being supported on said frame, the inner margins of said rings being aligned axially and defining a central opening that is coaxial with said mold cavity, a unitary, generally cylindrical rim movable inside said opening coaxially therein, means for reciprocating said rim axially of said opening in a rectilinear path between a first position permitting loading of the tire in said mold member and a second position in which said rim closes the space between said members thereby closing said mold cavity, said rim being formed with a chamber that extends circumferentially thereof, and means permitting heat exchange fluid to be passed through said chamber.

6. An apparatus for vulcanizing new rubber to a tire comprising a frame, a sectional mold that is formed with upper and lower annular mold members that can be assembled to form a mold, means for detachably securing said mold members in assembly, said assembled mold members being provided therebetween with a cavity that is adapted to receive a preformed tire that has new rubber disposed thereon, said mold members comprising respectively crown sections that are adapted to have tread-imparting matrices disposed therein, and rings disposed to embrace the sidewall portions of the tire and detachable from said crown sections, said rings being spaced axially when said mold members are assembled, said lower crown section being supported on said frame and having an inside diameter that is smaller than the outside diameter of said lower sidewall ring to support said lower sidewall ring for removal in an upward direction only, the inner margins of said rings being aligned axially and defining a central opening that is coaxial with said mold cavity, a unitary, generally cylindrical rim movable inside said opening coaxially therein, means for reciprocating said rim axially of said opening in a rectilinear path between a first position below said mold and permitting loading of the tire in said mold members, a second position in which said rim closes the space between said rings thereby closing said mold cavity, and a third position, said rim being formed with a projecting flange of larger outside diameter than the inside diameter of said lower ring to be engageable against said lower ring to permit said ring to be lifted from said lower crown section by said rim when said rim is moved upwardly from its second position to said third position, said rim also being formed on its outer surface with an axially-extending recess that is extended to open through its upper end, a member disposed in said recess in fluid-tight relation with said rim and with its outer surface flush with the outer surface of said rim, said member being formed with a generally right angular bore that opens at its lower end through the undersurface of said member for communication with the interior of said tire when said rim is disposed to close said mold cavity and that opens at its upper end for communication with a fluid supply for supplying air through said rim to the interior of said tire, and a pair of resilient members interposed between and engaged respectively said rings and the confronting portions of the sidewalls of said tire, and the bead portions of said tire and the confronting portions of the surface of said rim, said resilient members being compressible upon expansion of said tire to form fluid-tight seals between said rings and the confronting portions of the sidewalls of said tire, and the bead portions of said tire and the confronting portions of the surface of said rim, respectively.

References Cited in the file of this patent

UNITED STATES PATENTS

| | | |
|---|---|---|
| 1,333,062 | Coats | Mar. 9, 1920 |
| 1,734,766 | Fetter | Nov. 5, 1929 |
| 1,867,972 | Hubbert et al. | July 19, 1932 |
| 1,940,582 | De Mattia | Dec. 19, 1933 |
| 2,003,566 | Woock | June 4, 1935 |
| 2,020,023 | Flynn | Nov. 5, 1935 |
| 2,111,233 | Zangl | Mar. 15, 1938 |
| 2,227,798 | Rihn et al. | Jan. 7, 1941 |
| 2,327,639 | Heintz | Aug. 24, 1943 |
| 2,390,129 | Shobert | Dec. 4, 1945 |
| 2,597,550 | Tritt | May 20, 1952 |
| 2,683,898 | Glynn | July 20, 1954 |

FOREIGN PATENTS

| | | |
|---|---|---|
| 116,788 | Sweden | July 9, 1946 |